June 24, 1930.  W. E. DOMARATIUS  1,768,035
ICE PICK
Filed April 2, 1929
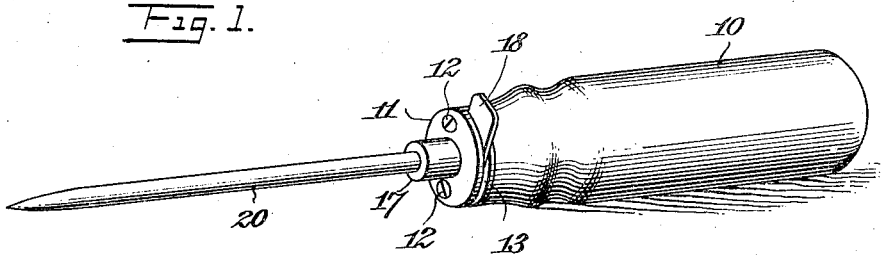
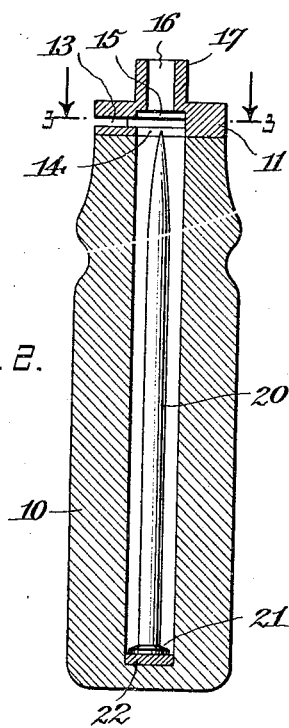
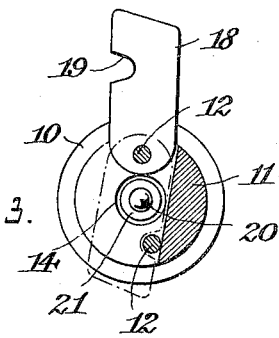
WITNESSES
INVENTOR
William E. Domaratius
BY
ATTORNEYS Patented June 24, 1930

1,768,035

UNITED STATES PATENT OFFICE

WILLIAM E. DOMARATIUS, OF BROOKLYN, NEW YORK

ICE PICK

Application filed April 2, 1929. Serial No. 351,950.

This invention relates to an implement adapted for breaking, chopping or slushing ice.

The principal object of the invention is the provision of an implement which embodies novel structural and functional features, to the end, that the pick or awl-like member may be safely disposed within the handle, when the implement is not in use, and which may be readily brought and be held disposed in a projecting position on the handle, to enable the use of the implement for the purposes mentioned.

With the foregoing, other objects of the invention will appear from the embodiment of the invention which by way of example is described in the following specification and illustrated in the accompanying drawings, in which Figure 1 is a perspective view of the implement ready for use.

Fig. 2 is a sectional view of the implement showing the pick member disposed within the handle.

Fig. 3 is a transverse sectional view taken on the line 3—3 of Fig. 2.

Referring now more particularly to the several views of the drawing, it will be apparent that the implement includes a hollow handle 10 of wood or any other preferred material. The handle 10 is open at one end and the other end is closed. A member 11 of metal is held in fixed position on the open end of the handle 10 by suitable fastening elements such as screws 12. The member 11 has a slot 13 which opens to a hole 14 in said member, and also opens to a recess 15, while the latter opens to a bore 16 in a boss 17 forming a part of the member 11. It will be apparent that the hole 14 is in axial alinement with the recess 15 and the bore 16. A plate 18 constituting an abutment is arranged for movement in the slot 13 and has one end thereof connected with one of the screws 12 for pivotal movement of the plate into a position across the hole 14 and the recess 15, and clear of the same. The free end of the plate 18 projects beyond the circumferential edge of the member 11 so that the plate may be readily manipulated into and out of the positions mentioned. The plate 18 has a notch 19 to accommodate the second screw 12, when the plate 18 is disposed across the hole 14 and recess 15. Use is made of a pick or awl-like element 20 in the form of a headed spike, of a length to be contained within the handle 10, as shown most clearly in Fig. 2. When the element 20 is disposed within the handle 10, the plate 18 may be brought to the position across the hole 14 as shown in dot and dash lines in Fig. 3 to keep said element 20 in the handle when the implement is not in use. In this way the implement is rendered harmless, particularly in the hands of children.

When it is desired to use the implement, the plate 18 is swung to the position shown in full lines in Fig. 3, whereupon the element 20, by inverting the handle 10 will move to a projected position in which the head 21 of said implement will be received in the recess 15. The plate 18 may then be brought to its other position so as to co-operate with the member 11 in holding the element 20 disposed in operative position, as shown in Fig. 1. When the pick element 20 is in the projecting position the head 21 thereof will abut the plate 18, consequently the longitudinal movement thereof will be effectively prevented, as the implement is being wielded for breaking, chopping or slushing ice. The pick element 20 may be allowed to drop into the handle 10 by merely moving the plate 18 clear of the head 21.

In order to eliminate noise, a rubber buffer 22 is arranged in the closed end of the handle 10, it being apparent that the head 21 comes into contact with the buffer when the pick element 20 drops into the handle 10.

I claim:

1. An ice pick having the combination of a hollow handle open at one end and the other end being closed, a separate pick element in the form of a headed spike of a length to be contained by said handle, a member secured to the open end of the handle adapted to receive the headed end of the spike, and an abutment on said member movable to a position to abut the headed end of the spike to cooperate with said member to hold the spike operatively disposed for use, said abutment being movable to a position to allow said spike to drop into the handle, and said abutment being movable to a position to keep the spike in the handle when not in use.

2. An ice pick having the combination of a hollow handle, a separate pick member of a length to be contained by the handle, a fixed member on the handle adapted to receive the pick member in a projecting position for use, said fixed member having a transverse slot therein, and a pivoted abutment carried by said fixed member movable into the slot to a position to co-operate with said fixed member to hold said pick member in the projecting position, said abutment being movable outwardly of said slot to a position clear of the pick member to allow the latter to drop into the handle, and said abutment when disposed in the position first mentioned serving to keep the pick member in said handle when not in use.

Signed at New York in the county of New York and State of New York this 30th day of March, A. D. 1929.

WILLIAM E. DOMARATIUS.